Nov. 19, 1929.   A. N. REEVES   1,736,327
PICKER STICK CHECK FOR LOOMS
Filed July 25, 1928    2 Sheets-Sheet 1

Inventor
Alfred N. Reeves.

By Clarence A. O'Brien
Attorney

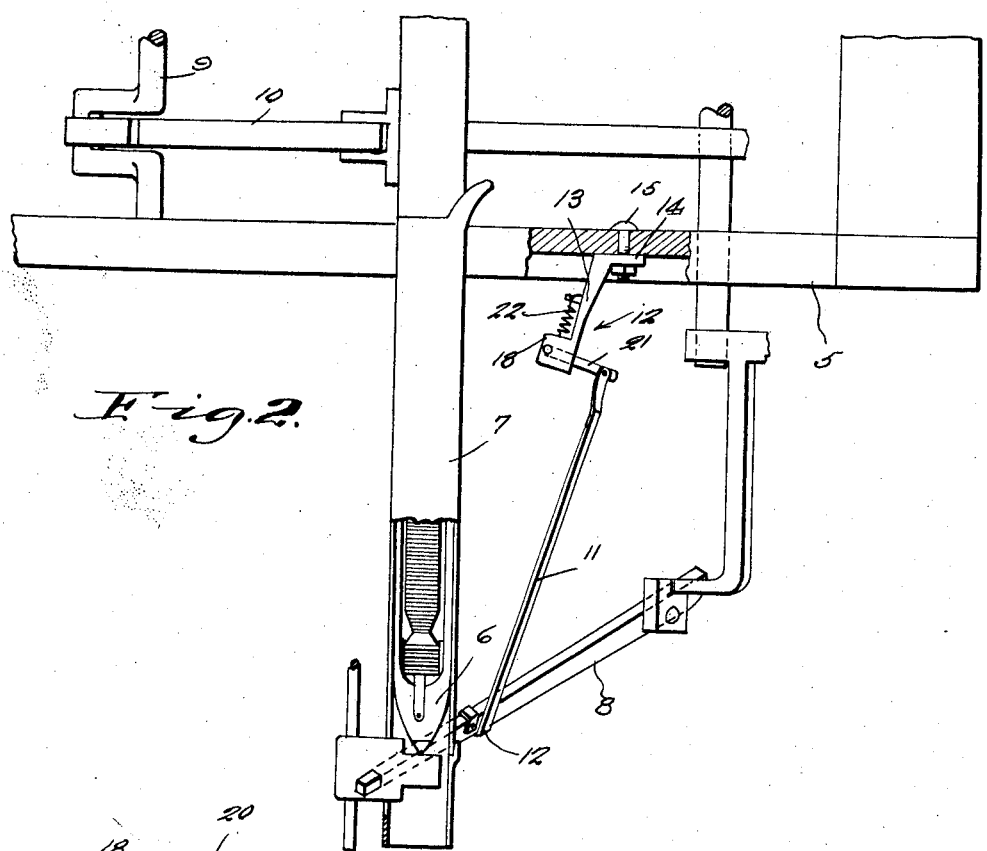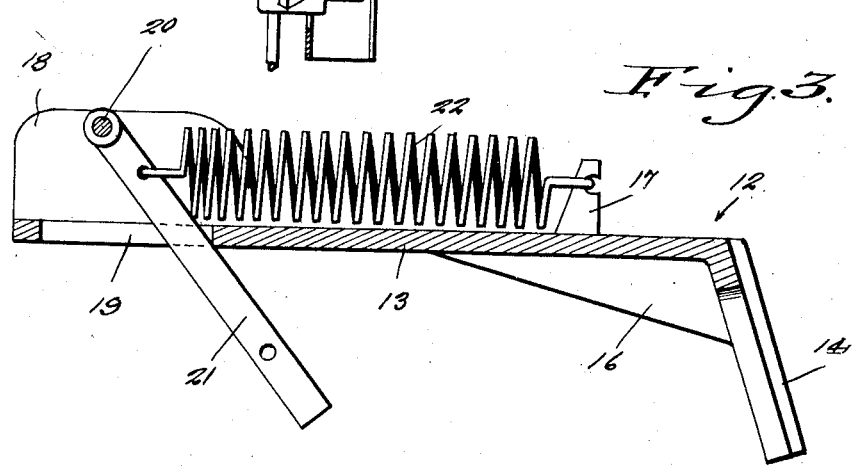

Patented Nov. 19, 1929

1,736,327

UNITED STATES PATENT OFFICE

ALFRED N. REEVES, OF NEW LONDON, CONNECTICUT

PICKER-STICK CHECK FOR LOOMS

Application filed July 25, 1928. Serial No. 295,298.

The present invention relates to an improved picker stick check for plain and box looms.

By way of introduction, I would state that the present invention is an improvement upon the picker stick check, shown, described, and claimed, in Patent #1,658,497, granted to me under date of February 7, 1928, and assigned to the Draper corporation.

As explained in the specification of that patent, any tension on the picker stick tending to move the shuttle in the box after its reception and prior to picking is undesirable.

The principal object is, therefore, to produce a refined and improved check which acts to check the shuttle but has no tendency to move the shuttle in the box from the time of reception until picking.

I aim to generally improve upon the patented structure referred to by providing a simplified structure, wherein the details cooperate in a more desirable manner to fulfill the requirements of an invention of this class in a reliable, dependable, and efficient manner.

Another object is to so construct the improved device that the picker stick is relieved of pressure on the shuttle, during the time boxes are being changed; to act on the most vital part of the loom, (the shuttle), through the picker stick, to make smoother cloth, to prevent many defects other than roughness, such as loops, breaking of the filling, broken picks, and to save many of loom supplies.

In the drawings:

Figure 2 is a top plan view of Figure 1.

Figure 3 is an enlarged sectional and elevational view of the primary part of the improved check.

Figure 1:
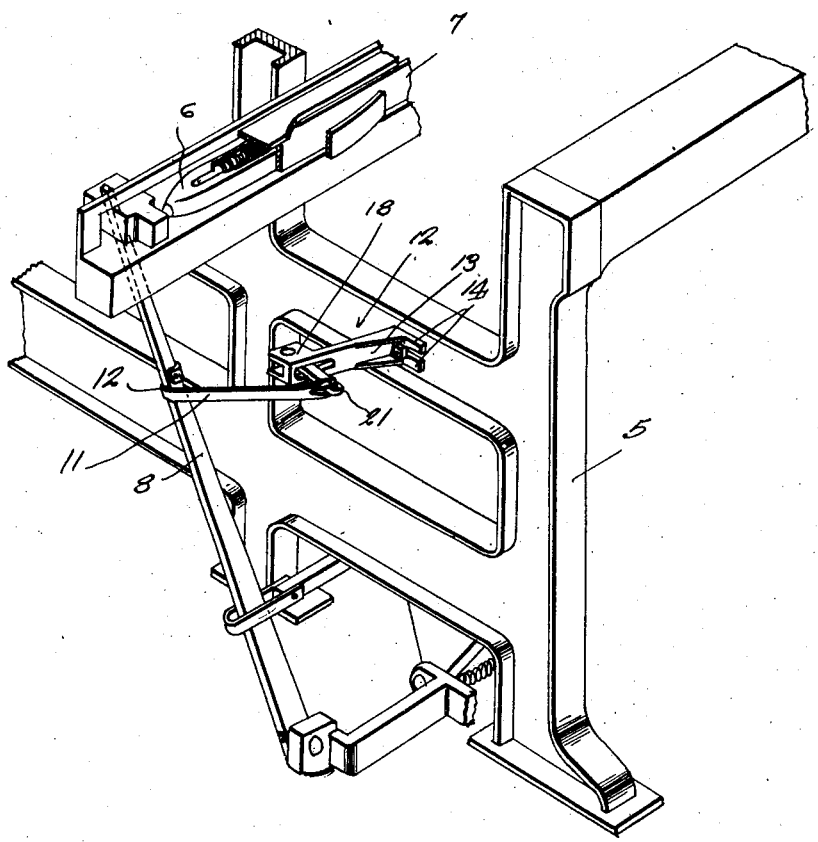
Figure 1 is a fragmentary perspective view of a conventional loom, showing the improved picker stick check applied thereto.
Figure 4:
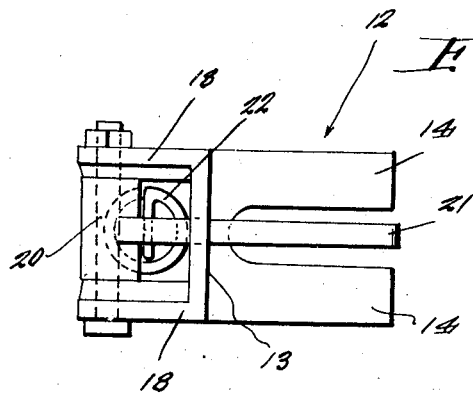
Figure 4 is an end elevation of Figure 3, looking in a direction from left to right.

Referring now to the drawings by reference ordinals, it will be observed that 5 designates generally an end frame of an ordinary loom, 6 the shuttle, 7 the shuttle box, and 8 the picker stick. I have also shown the lay crank shaft 9 and the operating pitman or connecting rod 10 associated therewith. Otherwise the details are the same as described in the patent previously referred to.

In carrying out the present invention I also employ a flexible strap 11, one end of which is wrapped around and fastened to the intermediate portion of the picker stick as at 12. The opposite end, instead of being directly connected with the end frame is connected thereto through the medium of a novel resilient check device generally designated by the reference character 12'. As better shown in Figure 3, this comprises a bracket, including an arm or plate 13, adapted for horizontal disposition, and having at one end obtuse fork arms 14, fastened to the frame by way of a bolt 15, as shown better in Figure 2.

The reference characters 16 designate reinforcing webs between the arms 13 and 14, 17 designates an outstanding lug, 18 a pair of parallel spaced flanges located in registry with the slot 19 formed in the plate or arm 13. Pivotally mounted between these flanges as at 20, is a swingable link 21, whose intermediate portion is fastened to one end of a coil spring 22. This coil spring is disposed alongside of the arm 13 and at the end thereof is anchored upon the notched lug 17. The link 21 extends outwardly through the slot 19, where it is connected with the inner end of the strap 11, and it is obvious that when the parts are in the position shown in Figures 1 and 2, and when the shuttle is in the box, it strikes the picker stick and forces it outwardly, causing a pull to be exerted upon the strap and brings into play the resistance spring, thereby exerting a yieldable pull, and desirable checking action. It is to be observed that the check exerts the maximum checking effect on the picker stick, when the crank is half way between back center and bottom center, so that as the lay moves forwardly the checking effect is diminished, that is to say, the action of the picker stick check is to relieve the pull of the strap on the picker stick so that the device acts to remove the shuttle checking effect by the forward movement of the lay.

The revised structure herein shown and described is held to be a distinct improvement upon the patented structure, in that it is more positive in operation, and characterized by greater strength and durability.

It is thought, however, that by carefully analyzing the detailed description in connection with the drawings, a clear understanding of the construction, operation and advantages by way of comparison with the patent will be had.

Hence a more lengthy description is regarded as unessential.

I claim:

A picker stick check comprising an arm provided with spaced parallel flanges, and at its inner end with attaching fork arms, a lug carried by the first named arm, a link pivotally mounted at one end between the flanges, said first named arm having a slot through and beyond which said link extends, and a coil spring fastened at one end to an intermediate portion of the link, and anchored at its opposite end upon the lug.

In testimony whereof I affix my signature.

ALFRED N. REEVES.